United States Patent [19]
Dornberger

[11] 3,761,805
[45] Sept. 25, 1973

[54] METHODS OF AND SYSTEMS FOR MEASURING CAPACITANCE USING A CONSTANT CURRENT CHARGING TECHNIQUE

[75] Inventor: Georg C. E. Dornberger, Phoenix, Ariz.

[73] Assignee: Western Electric Company, Incorporated, New York, N.Y.

[22] Filed: June 24, 1971

[21] Appl. No.: 156,263

[52] U.S. Cl.............. 324/60 C, 324/189, 328/129, 328/183
[51] Int. Cl....................... G01r 11/52, G01r 27/26
[58] Field of Search ..................... 324/60 C, 60 CD, 324/60 R, 189, 78 E; 328/121, 129, 183, 184; 307/228

[56] References Cited
UNITED STATES PATENTS

| | | | |
|---|---|---|---|
| 2,236,015 | 3/1941 | Sonnentag | 324/189 X |
| 2,661,420 | 12/1953 | Woodruff | 328/183 |
| 3,058,013 | 10/1962 | Acker | 307/228 |
| 3,437,834 | 3/1969 | Schwartz | 324/189 UX |
| 3,453,535 | 7/1969 | Anglin | 324/60 CD |
| 3,042,860 | 7/1962 | Shillington | 324/60 R |
| 3,452,272 | 6/1969 | Collins et al. | 324/60 C |

OTHER PUBLICATIONS

Transients and Waveforms, Department of the Army Technical Manual TM 11-669, Nov. 1951, pp. 32-34.
Pulse Width Measuring Method, Tele-Tech, April 1947, p. 57.

*Primary Examiner*—Stanley T. Krawczewicz
*Attorney*—W. M. Kan et al.

[57] ABSTRACT

In a constant current charging tenchique for measuring capacitance, a constant current is supplied to a capacitance to be measured and a voltage ramp is produced. Two voltage-level detectors sense the ramp. At a low level on the ramp, a first of the detectors triggers a time-interval meter which begins to count pulses from an oscillator. A second of the detectors stops the counting process when the voltage ramp reaches an upper level. The time measured by the meter is proportional to the value of the capacitance and can be used to calculate the actual value.

3 Claims, 5 Drawing Figures

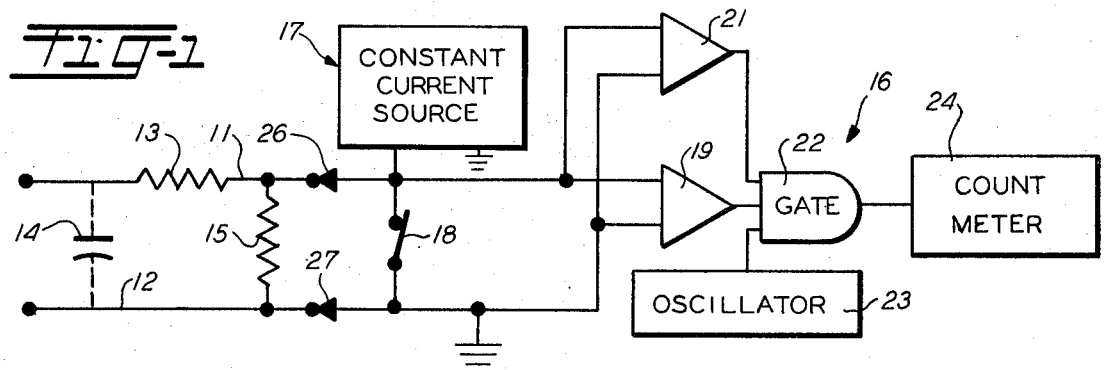
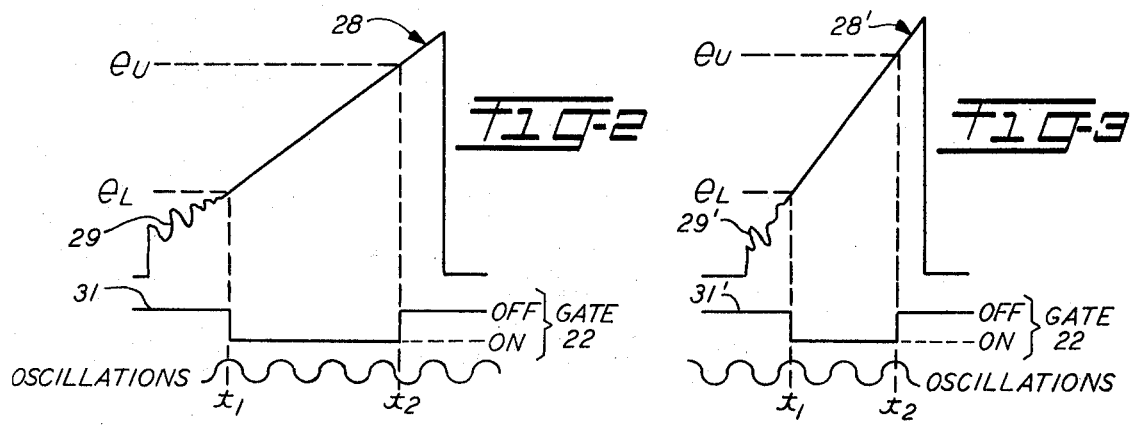
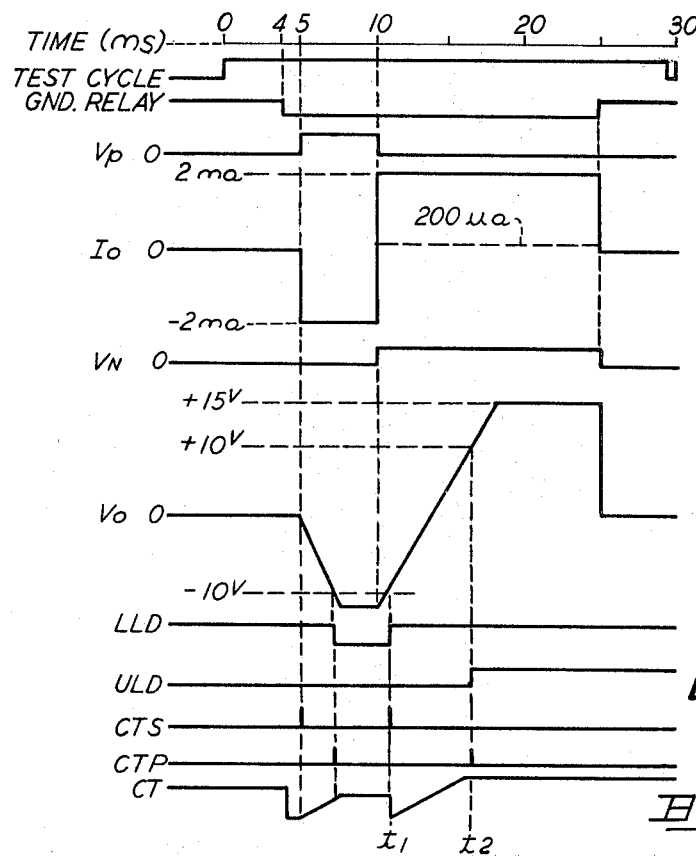

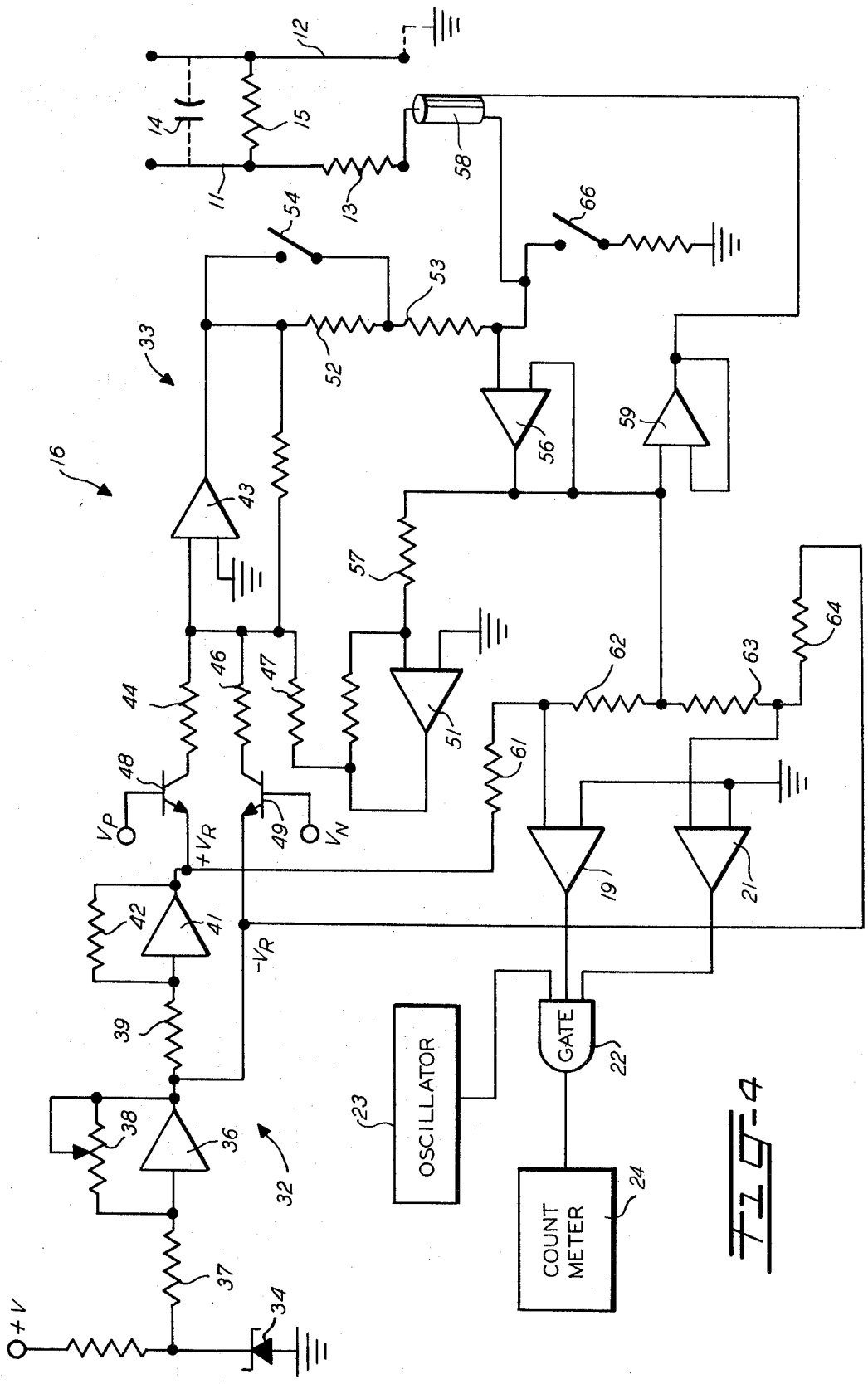

METHODS OF AND SYSTEMS FOR MEASURING CAPACITANCE USING A CONSTANT CURRENT CHARGING TECHNIQUE

BACKGROUND OF THE INVENTION

1. Field of the Invention

This invention relates to methods of and systems for measuring capacitance by using a constant current charging technique and particularly relates to methods of and systems for measuring capacitance value by determining the time required for a voltage excursion of an intermediate portion of a voltage charge ramp of the capacitance.

2. Description of the Prior Art

In the communications industry, twisted pairs of insulated conductors are stranded together to form the core of a communications cable. Due to the proximity of the conductors to each other and the composition of material used to insulate the conductors and to insulate and shield the cable core, various forms of capacitance appear normally between the conductors and between individual conductors and other elements of the cable. At high frequencies, these various capacitances provide a path for cross talk and other forms of cross linking of signals. Therefore, it is important to measure these capacitances prior to utilization of the cables in communications systems to insure that the capacitance values are of such value to avoid substantially the undesirable cross talk and cross linking of signals.

Since the cables are composed of numerous conductors of considerable length, various transient conditions, such as echo conditions, occur when a signal is applied initially to the cable. When an attempt is made to measure the various types of capacitance values of the communications cable, the initial transient conditions tend to conceal the actual capacitance measurement and thereby occasionally provide erroneous results.

In addition, in the measurement of other forms of capacitances such as individual capacitors, minor transient conditions could occur during the initial charging of the capacitor which would also tend to disturb the capacitance measuring operation.

Other methods of measuring the capacitance value of different types of capacitors are available. However, these systems require various types of bridge networks and other sophisticated equipment wherein the capacitor of unknown value is compared with a standard capacitor.

Another method of measuring the capacitance value of capacitors is a constant charging technique which includes the charging of the individual capacitor and the measuring of the time required for the capacitor to become fully charged. The time can be equated to capacitance. However, the transient conditions which occur during the initial phases of the charging cycle cause considerable oscillations at the forward end of the voltage ramp. The oscillations eventually are dampened but also cause a final capacitance value reading to be erroneous. The constant current charging technique provides a relatively simple operation with a time readout which can be used to calculate the capacitance value. However, in view of the transient conditions occurring at the forward end of the voltage ramp, it has been, heretofore, a questionable capacitance measuring technique.

SUMMARY OF THE INVENTION

It is therefore an object of this invention to provide new and improved methods of and systems for measuring capacitance value by using a constant current charging technique.

Another object of the invention is to provide new and improved methods of and systems for measuring the capacitance value of various types of capacitors by supplying a constant current to the capacitors being measured and monitoring the voltage ramp of the charging capacitor as an indication of the capacitance value thereof.

Still another object of this invention is to provide new and improved methods of and systems for developing a voltage ramp relating to the value of a capacitance being measured and selectively monitoring intermediate portions of the ramp to determine the capacitance value.

A method of measuring capacitance value using a constant current charging technique in accordance with certain principles of the invention may include the steps of charging the capacitance to a selected voltage level and determining the time period required for the capacitance to charge between selected voltage levels exclusive to transient dampened oscillations occurring during the charging cycle as a measure of the capacitance value.

A system for determining the value of a capacitance in accordance with certain principles of the invention may include means for supplying a constant current to the capacitance being measured, means for determining when the charging capacitor attains a first lower voltage level and a second upper voltage level, and means responsive to the determination of the determining means for measuring the time required for the capacitance to charge between the first voltage level and the second voltage level as an indication of the value of the capacitance being measured.

BRIEF DESCRIPTION OF THE DRAWINGS

Other objects and advantages of the present invention will be apparent from the following detailed description when considered in conjunction with the accompanying drawings in which:

FIG. 1 is a block diagram showing a system for measuring the value of a capacitance in accordance with certain principles of the invention;

FIGS. 2 and 3 are diagrams showing voltage charging ramps of the capacitance being measured with a time period for counting pulses to indicate the capacitance value of the capacitance being measured;

FIG. 4 is an electrical diagram showing one arrangement of circuit elements which are connected to accomplish the measuring of the value of a capacitance in accordance with the block diagram of FIG. 1; and FIG. 5 is a time and voltage level graph showing the timed correlation between various voltage and current level conditions occurring in the circuit of FIG. 4 during the measuring of the capacitance value.

DETAILED DESCRIPTION

Referring now to FIG. 1 there is illustrated a representation of a pair of insulated conductors 11 and 12 which are normally twisted together and form a portion of a multi-conductor stranded communications cable. The twisted pair includes conductor resistance 13 and insulation resistance 15. Due to the proximity of the pair, an inherent capacitance 14 extends between the conductors 11 and 12. This represents one form of capacitance which exists between twisted pairs of insulated conductors of a multi-conductor communications cable. Other forms of capacitance exist within a communications cable between the individual conductors of the cable and other components of the cable such as metallic shields surrounding the cable core.

For the purposes of explanation, this description will be limited to the measurement of the capacitance 14 between the twisted pair of conductors 11 and 12. However, it is to be noted that other forms of capacitance can be measured in the same manner and could utilize a scanning technique to successively connect the various twisted pairs of conductors to the capacitance measuring arrangement. In addition, individual capacitors could also be measured using this technique.

As illustrated in FIG. 1, a system 16 for measuring the value of the capacitance 14 includes a constant current source 17, a switch 18, a low level voltage detector 19, and a high level voltage detector 21. The system 16 further includes an AND gate 22, an oscillator 23, and a count meter 24.

In operation, termination points 26 and 27 of the system 16 are connected to the conductors 11 and 12 with the switch 18 being in a normally closed condition. With this arrangement, no current is supplied to the conductors 11 and 12. When the switch 18 is opened, the constant current source 17 is connected into the circuit to supply the constant current to the conductors 11 and 12 whereby the capacitance 14 begins to charge.

As illustrated in FIG. 2, a voltage ramp designated generally by the numeral 28, is developed by the charging capacitance 14. At the lower end of the voltage ramp 28, dampened oscillations 29 occur due to transient conditions apparent within the cable at this time. Ultimately, the oscillations 29 are dampened and the voltage ramp 28 assumes a linear rise.

When the voltage ramp 28 reaches a lower voltage level $e_L$, which is above the dampened oscillations 29 and in a linear portion of the voltage ramp, the detector 19 develops a signal which is fed to the AND gate 22. The oscillator 23 is continuously operating and is coupled to the AND gate 22 so that when the developed signal is fed from the detector 19 to the gate, the oscillations of the oscillator are coupled to the count meter 24 to actuate the meter to count each cycle of the oscillations.

Referring again to FIG. 2, when the voltage level $e_L$ is reached, the gate 22 is turned on at a time $t_1$ as indicated by a timing diagram 31. At this time the oscillations of the oscillator 23 are coupled to the count meter 24 and counted thereby.

When the voltage level of the ramp 28 reaches an upper level voltage $e_u$, a signal is developed by the detector 21. The developed signal is fed to the AND gate to turn off the gate. The oscillations from the oscillator 23 are thereby no longer coupled to the count meter 24 whereby the count meter stops counting. This condition is illustrated in FIG. 2 wherein the gate 22 is turned off when the voltage ramp 28 reaches the level of the voltage $e_u$. This time is represented by $t_2$ wherein the timing diagram 31 indicates the turning off of the gate 22. Thus the count meter 24 counts the oscillations which occur between the times $t_1$ and $t_2$.

Since $e_L$ and $e_u$ will always have constant values regardless of the capacitances being measured, $e_u$ minus $e_L$ will be considered a constant value E. The charging current represented by I, is constant. The capacitance value is determined by the equation: $C = (I/E)(t_2 - t_1)$. Since I/E is a constant, the ultimate equation becomes $C = K(t_2 - t_1)$. Thus the time element is directly proportional to the capacitance value.

Therefore, by monitoring an intermediate portion of the voltage ramp 28 subsequent to the occurrence of oscillations 29 and prior to the ultimate attainment of the complete charge of the capacitance 14, a linear portion of the voltage ramp is utilized to determine accurately the value of the capacitance being measured. This avoids the necessity of having to consider the effects of the oscillations 29 and any undesirable non-linearities which may occur as the voltage ramp 28 approaches the extreme upper limit of the complete charge.

Referring now to FIG. 3, another voltage ramp designated by the numeral 28' is shown to illustrate that another capacitance may have a different charging time as a result of a different value of capacitance. But the linear, intermediate portion of the ramp 28' is still monitored and is used between the voltage values $e_L$ and $e_u$ to couple oscillations to the count meter 24 to facilitate the accurate determination of the capacitance value.

Referring now to FIG. 4, there is illustrated a circuit diagram of the capacitance measuring system 16. The system 16 includes a current-generator reference circuit 32 and a current generator 33 which together form the constant current source 17 (FIG. 1). Also illustrated in FIG. 4 are the low level detector 19 and the upper level detector 21 as well as the AND gate 22, the oscillator 23 and the count meter 24. The current-generator reference circuit 32 includes a reference zener diode 34 which develops 6.3 volts for application to an operational amplifier 36. The operational amplifier 36 is provided with an input resistor 37 and an adjustable feed back resistor 38 which is adjustable to allow the development of −5.0 volts at the output of the amplifier. The −5.0 volts output is designated $-v_r$.

The output of the amplifier 36 is coupled through an input resistor 39 to another operational amplifier 41 which is provided with a feedback resistor 42. The input resistor 39 and the feedback resistor 42 are a matched pair of resistors which provide 5.0 volts at the output of the amplifier 41. The 5.0 volts output is designated $v_r$. Thus the current-generator reference circuit 32 provides outputs of −5.0 volts ($-v_r$) and 5.0 volts ($v_r$).

The constant current generator 33 is a conventional circuit and includes an operational amplifier 43. The input circuit to the operational amplifier 43 includes three branches having resistors 44, 46, and 47. The resistors 44 and 46 are connected to transistors 48 and 49, respectively, which function as switches to couple $v_r$ and $-v_r$, respectively, from the reference circuit 32 to the amplifier 43. The resistor 47 is connected to the output of a feedback amplifier 51 which is connected in a feedback loop for the amplifier 43.

The output of the amplifier 43 is developed across one or both of two programming resistors 52 and 53 depending upon the position of a range-relay contact 54. The output current of the amplifier 43 flows through one or both of the resistors 52 and 53 to develop a voltage which is the output voltage of the amplifier and designated $v_o$. The output voltage $v_o$ of the amplifier 43, which is developed across one or both of the resistors 52 and 53, is coupled to the input of an operational amplifier 56 which functions as a unity gain follower and presents a very high input impedance. Thus the amplifier 56 has a negligible current drain effect on the generator 33.

The output of the amplifier 56 is coupled through an input resistor 57 to the input of the feedback amplifier 51. The function of the feedback loop, which includes the amplifiers 51 and 56, is to add the output voltage $v_o$ to the amplifier 43 by inverting and dividing by two the output voltage so that the voltage is fed back to the amplifier 43 in the correct polarity.

The output voltage $v_o$ is also connected to the center conductor of a shielded cable 58 and is coupled through the cable to the capacitance 14 to be measured wherein the capacitance is indicated as that capacitance between the twisted pairs of conductors 11 and 12.

The output of the amplifier 56 which is the voltage $v_o$ is coupled to the input of an operational amplifier 59 which functions as a guard driver. The output of the amplifier 59 is connected to the shield of the cable 58 and insures that shields on the system and cables of the test fixture follow the output of the generator. This eliminates any capacitive effects from appearing in the measured results where such effects could occur through cable of the test system and any fixture used.

The conductor 12 is illustrated in FIG. 4 as not being connected to any external circuits. However, during the testing cycle, a scanner is used to scan over, in consecutive order, all of the conductors of a cable being tested by grounding one conductor, such as conductor 12, and connecting the other conductor, such as conductor 11, to the center conductor of the cable 58. Thus, during the testing cycle for the capacitance 14, the conductor 12 would be at ground.

The voltages $v_r$ and $-v_r$ are connected to a voltage divider network which includes resistors 61, 62, 63, and 64. The inputs to the level detectors 19 and 21 are connected to the voltage divider network as is the output voltage $v_o$ of the amplifier 59 which is the output voltage of the current generator 33.

A contact 66 of a grounding relay (not shown) is connectable into the current generator 33 to ground the output of the amplifier 43 when the current generator is not being used to assist in the measurement of the value of the capacitance 14.

Referring now to FIGS. 4 and 5, a cycle of operation for determining the value of the capacitance 14 is to be accomplished in approximately 30 milliseconds as illustrated in the time graph at the top of FIG. 5. Initially, a range selection procedure must be conducted on the particular capacitance to be measured to insure that the proper level of constant current $I_o$ is supplied to the capacitance. In the present embodiment, two current levels are used, 2 milliamps and 200 microamps. A sampling of a charge time must be taken to determine which current level is to be used in the actual measuring operation.

At the beginning of the test, 4 milliseconds are allowed for the selection of a particular pair of twisted conductors, the capacitance of which is to be measured. After 4 milliseconds, the range selection procedure is started whereby the grounding relay is controlled by a GND relay signal (FIG. 5) to open contact 66 thereby removing ground from the output of the amplifier 43. This also causes the count meter 24 to be reset for a counting cycle as indicated by a count graph in FIG. 5.

At about 5 milliseconds, a positive reference potential $v_p$, the graph of which is illustrated in FIG. 5, is applied to the base of the transistor 48 which facilitates the turning on of the transistor to connect $v_r$ to the amplifier 43. At this time the level of the output voltage $v_o$ begins to develop in a negative direction as indicated in the graphs of FIG. 5. Further, at this instant, the conditions of the level detectors 19 and 21 permit the count meter 24 to be started for the sampling of the charge time for range selection. This is indicated in FIG. 5 by LLD (low level detector 19), ULD (upper level detector 21), CST (center start) and CT (count). The range relay is kept in an energized condition so that a negative current flows into the selected pair of conductors 11 and 12. By keeping the range relay energized, the associated contact 54 will remain closed to short out the resistor 52 so that the programming resistor 53 and the voltage $v_r$ establish a $-2$ milliamps of constant current $I_o$ (FIG. 5) flowing into the selected pair of conductors 11 and 12.

Depending upon the value of the capacitance 14, a specific period of time is required for the output voltage $v_o$ to drop below a negative 10 volts. At this level, the first level detector 19 is controlled to shift its output signal level in a negative direction. This negative shift stops the count meter 24 as indicated by a CTP graph and the CT graph of FIG. 5. Also, a delay single shot flip-flop (not shown) is started which allows the negative ramp of the voltage $v_o$ to bottom out at about a negative 12 to a negative 15 volts. The reading of the count meter 24 is compared with a fixed range limit and if it is less than a predetermined time, the range relay is de-energized to add the resistor 52 into the circuit so that the current $I_o$ will be 200 microamps for the actual capacitance determining procedure. If the reading is higher than the predetermined time, the range relay is maintained in the energized condition so that the current $I_o$ will be 2 milliamps.

After the range comparison, a negative reference voltage $v_n$ is applied to the base of the transistor 49 and the voltage $v_p$ is removed from the base of the transistor 48. This facilitates the application of the reference voltage $-v_r$ to the input of the amplifier 43 whereby the current $I_o$ reverses in direction and a new positive going ramp for voltage $v_o$ is initiated. These conditions are indicated as occurring at approximately 10 milliseconds into the cycle of operation as viewed in the graphs of FIG. 5.

As the ramp passed through the $-10$ volt level, the low level detector 19 is again controlled to shift its output signal (LLD) in a positive direction which turns on the gate 22 to couple the oscillations from the oscillator 23 to the count meter 24. At this time the count meter 24 starts to count the oscillations. The incline of the positive-going ramp of the voltage $v_o$ is dependent upon the value of the capacitance 14. As the voltage level of the voltage $v_o$ passes through the $+10$ volt level, the second level detector 21 is controlled to shift its output signal (ULD) in a positive direction which is coupled to the gate 22 to turn off the gate whereby the oscillations of the oscillator 23 are no longer coupled to the count meter 24. Thus the count meter 24 stops counting.

Thereafter the negative voltage $v_n$ is removed so that the negative voltage $-v_r$ is removed from the input of the amplifier 43. Consequently, the output voltage $v_o$ drops sharply to a zero level. In addition, the grounding relay is controlled at the same time to close the contact 66 thereby grounding the output of the current generator 33. If the range relay had been controlled previously to insert the resistor 52 into the circuit, the relay is now controlled to close the contact 54 so that the resistor is effectively removed from the circuit.

The count displayed on the count meter 24 indicates time. This reading can be utilized, as previously explained, to compute the value of the capacitance 14. Thus by utilizing the constant current source 19 in combination with the level detectors 19 and 21, a selected, intermediate, linear portion of the charging ramp of the voltage $v_o$ is used to determine the value of the capacitance 14. This permits the utilization of a constant current charging technique of measuring capacitance value without concern for the transient oscillations 29 (FIG. 2) which occur at the lower end of the ramp and without concern for any undesirable effects which occur at the upper end of the ramp as the ramp approaches the extreme upper limit.

What is claimed is:

1. A method of measuring a capacitance value which comprises the steps of:

charging a capacitance with a constant current to generate a voltage ramp by the capacitance during the charging of the capacitance;

designating a first voltage value selected to occur while the ramp is rising linearly wherein the first value has a magnitude greater than the magnitude of any oscillations induced in the voltage ramp due to initially charging the capacitance;

designating a second voltage value selected to occur subsequent to the first value and while the ramp is rising linearly, and measuring the time required for the voltage ramp to rise linearly from the first voltage value to the second voltage value.

2. A method of measuring a capacitance value existing between two insulated conductors of a plurality of conductors which are stranded together to form a core of a communications cable, the method comprising the steps of:

applying a constant current to the conductors to charge a capacitance therebetween to thereby develop a voltage rise;

detecting when the voltage rise reaches a first predetermined value selected to occur subsequent to random oscillations resulting upon initial application of the current and selected to occur while the voltage rise is substantially linear;

detecting when the voltage rises to a second predetermined value selected to occur while the voltage rise is substantially linear, and measuring the time required for the voltage to rise from the first predetermined value to the second predetermined value.

3. A system for measuring a capacitance value existing between two insulated conductors of a plurality of conductors which are stranded together to form a core of a communications cable, the system comprising:

means for applying a constant current to the conductor to develop a voltage rise in the system due to a capacitance between the conductors;

first means coupled to the conductors for detecting when the voltage rise reaches a first predetermined value selected to occur subsequent to random oscillations resulting in the system upon initially applying the current and while the voltage rise is substantially linear;

second means coupled to the conductors for detecting when the voltage rise reaches a second predetermined value selected to occur subsequent to the first value and while the voltage rise is still linear, and means coupled to the first and second detecting means for measuring the time required for the voltage to rise from the first value to the second value.

* * * * *